(12) United States Patent
Bao et al.

(10) Patent No.: US 10,191,599 B2
(45) Date of Patent: Jan. 29, 2019

(54) IN-CELL TOUCH PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhiying Bao, Beijing (CN); Rui Xu, Beijing (CN); Weijie Zhao, Beijing (CN); Zhenhua Lv, Beijing (CN); Yanchen Li, Beijing (CN); Xi Chen, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 124 days.

(21) Appl. No.: 14/915,954

(22) PCT Filed: Aug. 21, 2015

(86) PCT No.: PCT/CN2015/087768
§ 371 (c)(1),
(2) Date: Mar. 2, 2016

(87) PCT Pub. No.: WO2016/110104
PCT Pub. Date: Jul. 14, 2016

(65) Prior Publication Data
US 2016/0216802 A1    Jul. 28, 2016

(30) Foreign Application Priority Data
Jan. 9, 2015  (CN) .......................... 2015 1 0012621

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 2203/04103* (2013.01); *G06F 2203/04111* (2013.01)

(58) Field of Classification Search
None
See application file for complete search history.

(56) References Cited

U.S. PATENT DOCUMENTS

2007/0266559 A1\* 11/2007 Lee ...................... H05K 3/4652
29/852
2012/0218199 A1\* 8/2012 Kim ...................... G06F 3/0412
345/173

(Continued)

FOREIGN PATENT DOCUMENTS

CN        104020893 A     9/2014
CN        104022127 A     9/2014

(Continued)

OTHER PUBLICATIONS

Chinese Office Action dated Jan. 13, 2017.

*Primary Examiner* — Matthew Yeung
(74) *Attorney, Agent, or Firm* — Dilworth & Barrese, LLP; Michael J. Musella, Esq.

(57) ABSTRACT

An in-cell touch screen and a display device are provided. In the in-cell touch screens, an insulation layer, in an area that each self-capacitance electrode overlap a wire, is provided with at least a first hole that runs through the insulation layer and each self-capacitance electrode is electrically connected with a corresponding wire via a corresponding first via hole; each self-capacitance electrode, within an area overlapping other wire than the corresponding wire and at a position corresponding to the first via hole, is disposed with a second (Continued)

via hole that runs through the self-capacitance electrode. An orthogonal projection of a second via hole on a lower substrate covers an orthogonal projection of a first via hole on the lower substrate. The in-cell touch screen can solve a problem of uneven image display due to nonuniform distribution of via holes in an insulation layer.

20 Claims, 9 Drawing Sheets

(56) References Cited

U.S. PATENT DOCUMENTS

| | | | | |
|---|---|---|---|---|
| 2012/0248579 A1* | 10/2012 | Endo | ............... | H01L 21/76898 |
| | | | | 257/621 |
| 2014/0022210 A1* | 1/2014 | Wu | ................ | G02F 1/13338 |
| | | | | 345/174 |
| 2014/0353691 A1* | 12/2014 | Lee | ................ | H01L 27/323 |
| | | | | 257/88 |

FOREIGN PATENT DOCUMENTS

| CN | 104049800 A | 9/2014 |
|---|---|---|
| CN | 104102402 A | 10/2014 |

\* cited by examiner

IN-CELL TOUCH PANEL AND DISPLAY DEVICE

TECHNICAL FIELD

At least one embodiment of the present disclosure pertains to an in-cell touch panel and a display device.

BACKGROUND

With rapid development of display technology, touch screen panels are gradually becoming popular in people's lives. Currently, touch screen panels, according to structure, can be divided into types including add-on mode touch panels, on-cell touch panels and in-cell touch panels. For example, an add-on mode touch panel can be formed in a way that a touch screen and a liquid crystal display screen is manufactured separately and then assembled together to form a liquid crystal display panel having touch function. Add-on mode touch panels suffer from disadvantages such as high manufacturing cost, low light transmissivity, thicker module, and so on. For example, an in-cell touch panel, with touch electrodes being embedded inside a liquid crystal display panel, can reduce a thickness of a module as a whole and also obviously reduce manufacture cost of a touch screen, and is attractive among panel manufacturers.

Currently, the principle of mutual capacitance or self-capacitance is employed in an in-cell touch panel to realize detection of a touch position of a finger. In terms of self-capacitance principle, a plurality of self-capacitance electrodes on a same layer and insulated from each other can be provided. Upon a screen being untouched by a human body, capacitance endured by each self-capacitance electrode is at a fixed value; and upon a screen being touched by a human body, capacitance endured by each self-capacitance electrode is at the sum of the fixed value plus capacitance of the human body. A touch detection chip, in a touch period, can determine a touch position by detecting variation of the capacitance value of respective self-capacitance electrodes. In contrast with a case that capacitance of a human body can be applied only to projected capacitance in mutual capacitance, capacitance of a human body can be applied to all self-capacitance, thus touch variation generated due to touch on the screen by human is greater than that of a screen manufactured according to the principle of mutual capacitance. Therefore, a touch screen of self-capacitance, with respect to a touch screen of mutual capacitance, can effectively increase signal-to-noise ratio, hence improving accuracy of touch sensing.

SUMMARY

At least one embodiment of the present disclosure provides an in-cell touch screen that can be employed to solve a problem of nonuniform of image display due to nonuniform distribution of via holes in an insulation layer.

At least one embodiment of the present disclosure provides an in-cell touch screen, comprising: an upper substrate and a lower substrate that are provided opposite to each other; a plurality of mutually independent self-capacitance electrodes disposed on a side, facing the lower substrate, of the upper substrate, or disposed on side, facing the upper substrate, of the lower substrate; wires that are disposed on a different layer from the self-capacitance electrodes and electrically connected correspondingly with the self-capacitance electrodes; and an insulation layer that is provided between the self-capacitance electrodes and the wires. The insulation layer, in an area that each self-capacitance electrodes overlaps a corresponding wire, is provided with at least a first hole that runs through the insulation layer and each self-capacitance electrode is electrically connected with the corresponding wire via a corresponding first via hole; each self-capacitance electrode, within an area overlapping other wire than the corresponding wire and at a position corresponding to the first via hole, is disposed with a second via hole, and the second via hole runs through the self-capacitance electrode, and an orthogonal projection of the second via hole on the lower substrate covers an orthogonal projection of the first via hole on the lower substrate.

At least one embodiment in the present disclosure provides a display device, comprising the above in-cell touch screen provided in the embodiment of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and, it is not limitative to the scope of the present disclosure.

FIG. 2b is a schematic view for a sectional structure in A-A' direction of an in-cell touch screen illustrated in FIG. 2a;

FIG. 2c is a schematic view for a sectional structure in B-B' direction of an in-cell touch screen illustrated in FIG. 2a;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," "the," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Thickness and shape of the film layers illustrated in figures does not reflect actual scale but to schematically illustrate the content of the present disclosure.

Figure 1:
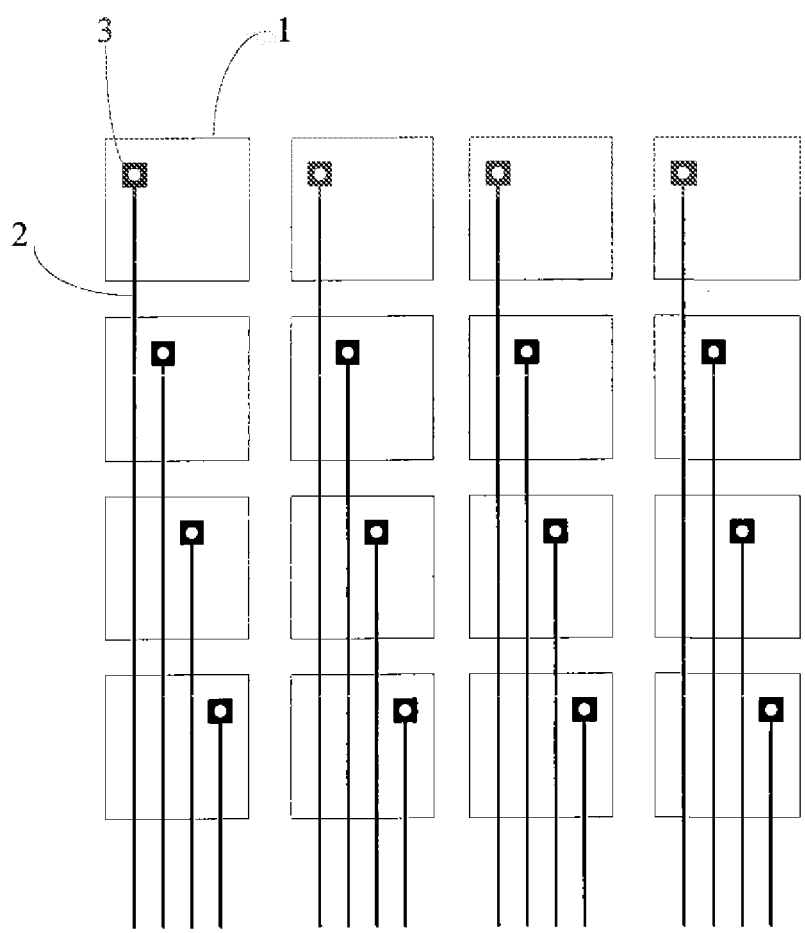
FIG. 1 is a schematic view for a structure of an in-cell touch screen.

Inventors of the present application has noted, in research, that an wire that is connected correspondingly with a self-capacitance electrode is usually provided to connect a self-capacitance electrode with a touch detection chip in an in-cell touch screen. For example, as illustrated in FIG. 1, a wire 1 is located below a self-capacitance electrode 2 and each wire 1 is merely connected to a corresponding self-capacitance electrode 2 through a via hole 3, without being eclectically connected to the other self-capacitance electrodes 2. However, in such a structure, distribution of via holes in a whole display panel is nonuniform, which will influence uniformity of image display.

At least one embodiment of the present disclosure provides an in-cell touch screen, as illustrated in FIG. 2a to FIG. 2d, that comprises: an upper substrate 100 and a lower substrate 200 that are provided opposite to each other, a plurality of mutually independent self-capacitance electrodes 01 located on a side, facing the lower substrate 200, of the upper substrate 100 or on a side, facing the upper substrate 100, of the lower substrate 200, wires 02 that are disposed on a different layer from the self-capacitance electrodes and electrically connected with respect to the self-capacitance electrodes 01, and an insulation layer 03 that is located between the self-capacitance electrodes 01 and the wires 02. The insulation layer 03, in an area that each self-capacitance electrode overlaps a wire 02, is provided with at least a first via hole 04 that runs through the insulation layer 03, with each self-capacitance electrode 01 being electrically connected to a corresponding wire 02 via a corresponding first via hole 04 and each wire 02 being electrically connected to a self-capacitance electrode 01; the each self-capacitance electrode 01, in an area overlapping other wire 02 than the corresponding wire 02 and at a position to which a first via hole 04 corresponds, is provided with a second via hole 05 that runs through a self-capacitance electrode 01, and an orthogonal projection of the second via hole 05 on a lower substrate 200 covers an orthogonal projection of the first vial hole 04 on the lower substrate.

In the above in-cell touch screen provided in the embodiment of the present disclosure, an insulation layer, in an area that each self-capacitance electrode overlaps an wire, is provided with a first via hole that runs through the insulation layer, with each self-capacitance electrode being electrically connected with a corresponding wire via a corresponding first via hole; each self-capacitance electrode, within an area overlapping other wire than a corresponding wire and at a position corresponding to a first via hole, is disposed with a second via hole that runs through a self-capacitance electrode, with an orthogonal projection of a second via hole on a lower substrate covering an orthogonal projection of a first via hole on the lower substrate. The in-cell touch screen, on the basis of ensuring that first via holes in an insulation layer of the in-cell touch screen are uniformly distributed, can also ensure that a wire is electrically connected with a corresponding self-capacitance electrode and other wires, except the one that is electrically connected with the corresponding self-capacitance electrode, are insulated from the self-capacitance electrode; therefore, on a basis that a self-capacitance electrode is connected with a wire correctly, it is able to solve a problem of uneven image display due to nonuniform distribution of via holes in an insulation layer.

It is to be explained that in above touch screen provided in the embodiment of the present disclosure, an insulation layer, disposed between self-capacitance electrodes and wires, can include a plurality of film layers or one film layer, as long as the insulation layer can guarantee that self-capacitance electrodes and wires are insulated from each other, which will not be limited herein.

For example, to ensure display uniformity, the shapes and sizes of respective first via holes in an in-cell touch screen provided in at least one embodiment of the present disclosure can be the same. For example, in a specific implementation, the shape of a first via hole, in an in-cell touch screen provided above in an embodiment of the present disclosure, can be circular, rectangular or of any other geometric shapes, which will not be limited herein.

Figure 2A:
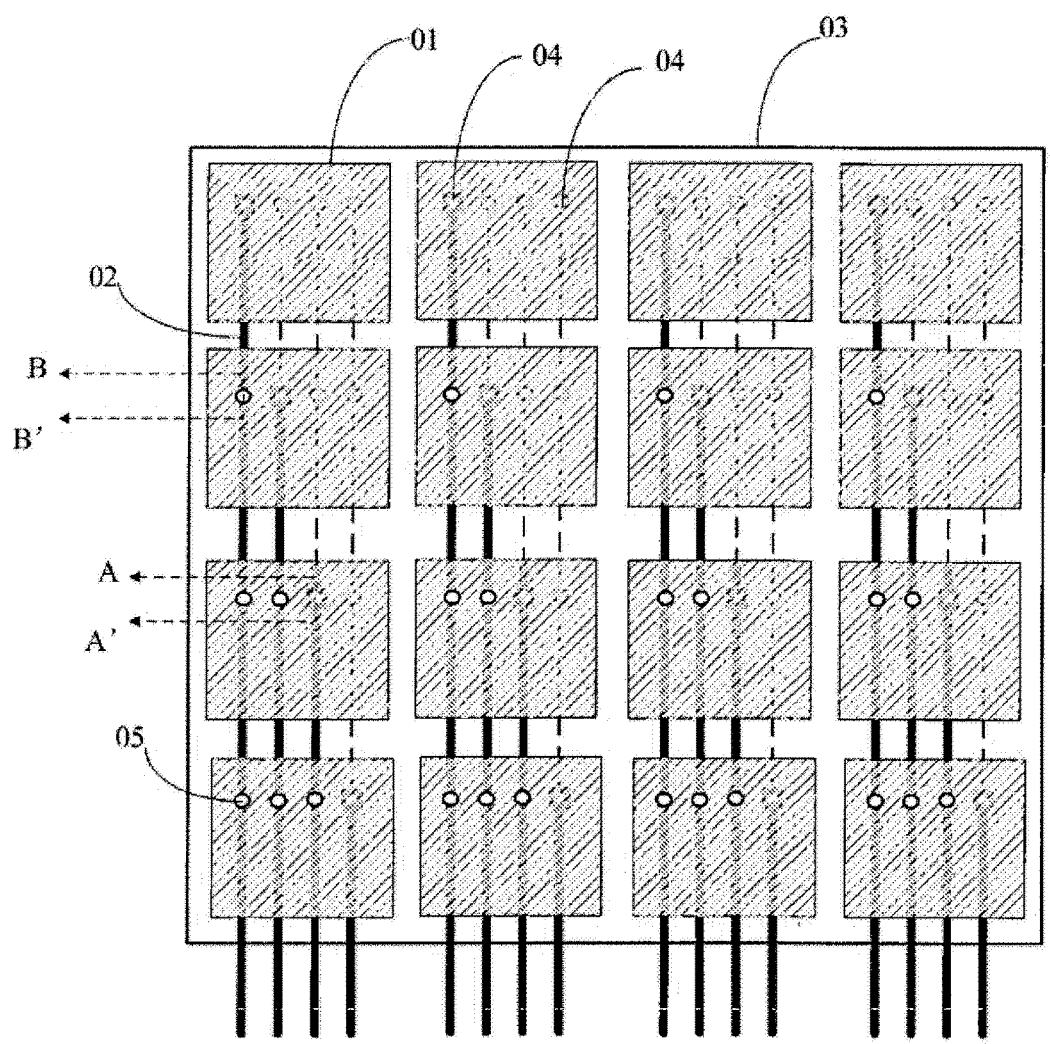
FIG. 2a is a schematic views for a structure of a first in-cell touch screen provided in an embodiment of the present disclosure.
Figure 2B:
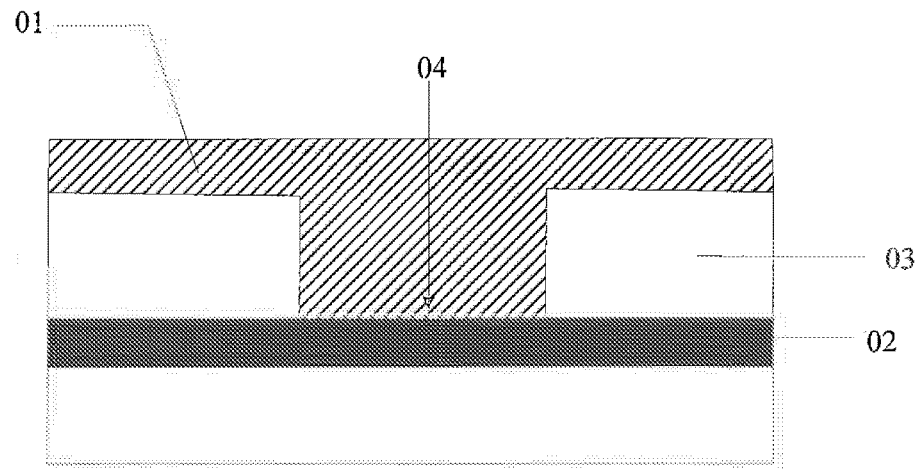

In a specific implementation, by considering size deviation and alignment accuracy in forming a via hole, for example, as illustrated in FIG. 2b, the diameter of a first via hole 04, in an in-cell touch screen provided in at least one embodiment of the present disclosure, can be less than the width of a wire 02 at a corresponding position.

Figure 2C:
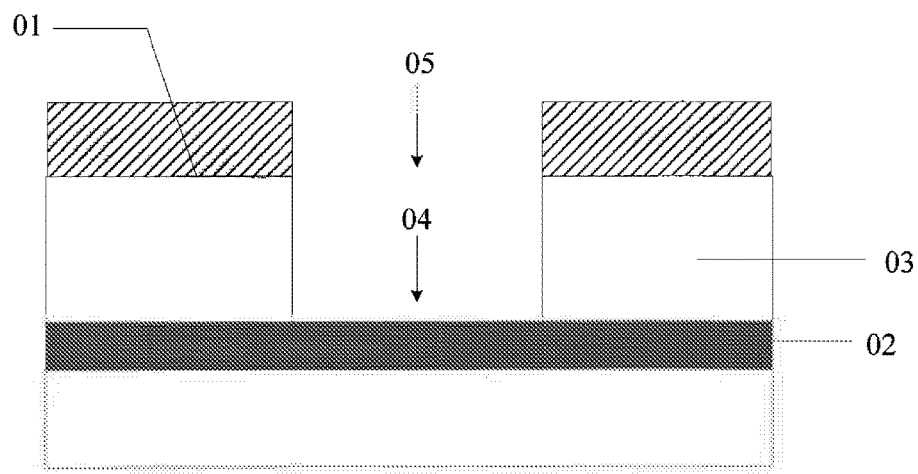

In a specific implementation, because the thickness of a wire is usually greater than the thickness of a self-capacitance electrode, considering size deviation and alignment accuracy in manufacturing, for example, as illustrated in FIG. 2c, the diameter of a second via hole 05, in an in-cell touch screen provided in at least one embodiment of the present disclosure, can be less than the width of a wire 02 at a corresponding position.

In a specific implementation, considering size deviation and alignment accuracy in manufacturing, for example, an in-cell touch screen provided in at least one embodiment of the present disclosure can further include: a conductive base block that is disposed on a same layer as the respective wire and corresponds to a first via hole. Because the thickness of a wire layer is greater than that of a self-capacitance electrode (a thickness of a self-capacitance electrode is 400-600 nm), deviation of the critical dimension of a wire layer is greater than that of an electrode layer, and an orthogonal projection of each conductive base block on an lower substrate covers an orthogonal projection of a second via hole on the lower substrate; each wire is connected with a corresponding self-capacitance electrode via a corresponding conductive base block.

Figure 3A:
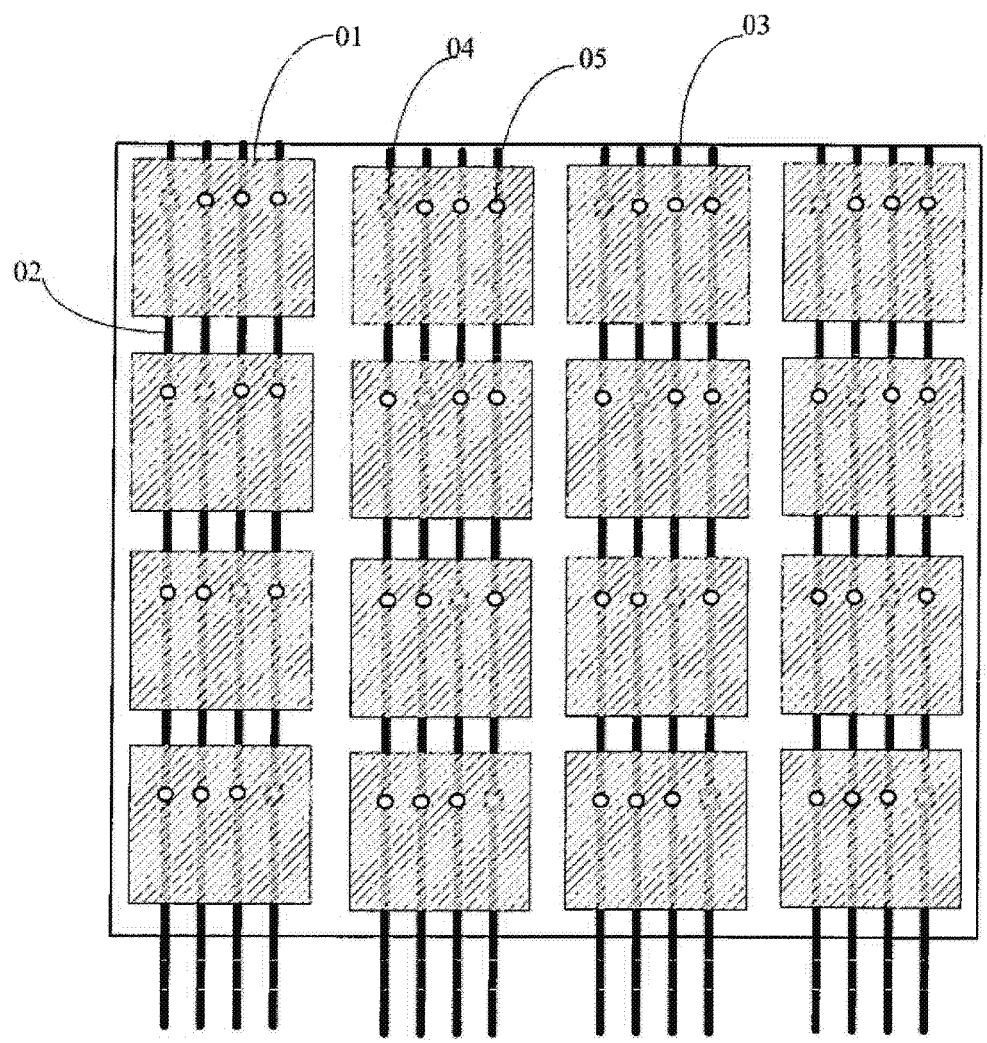
FIG. 3a is a schematic view for a structure of a second in-cell touch screen provided in an embodiment of the present disclosure.
Figure 3B:
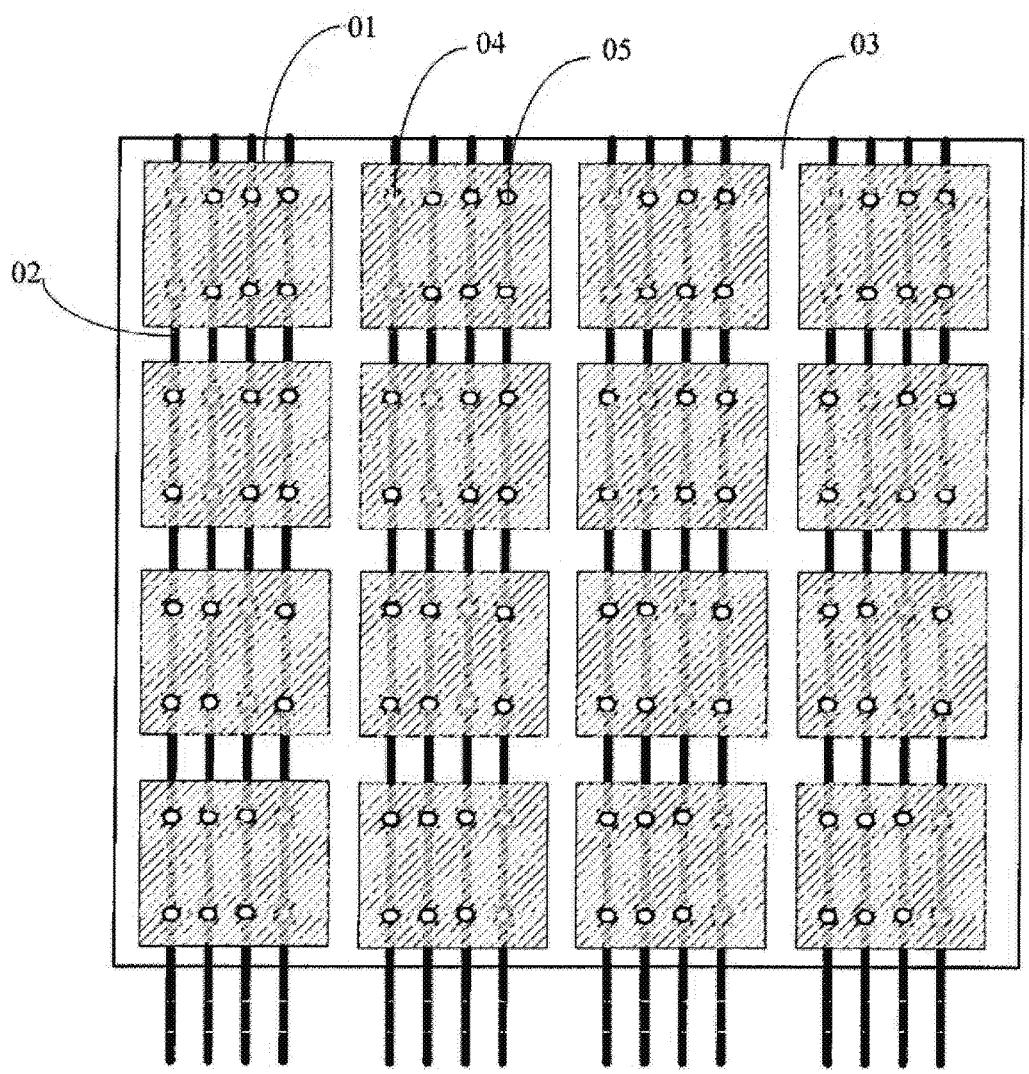
FIG. 3b is a schematic view for a structure of a third in-cell touch screen provided in an embodiment of the present disclosure.

For example, to make manufacturing less difficult and wires distributed uniformly, in an in-cell touch screen provided in at least one embodiment of the present disclosure, as illustrated in FIGS. 3a and 3b, each wire 02 can extend in a same direction.

For example, to realize equal capacitance design, in an in-cell touch screen provided in at least one embodiment of the present disclosure, as illustrated in FIG. 3a and FIG. 3b, the lengths of the wires 02 can be the same.

For example, in an in-cell touch screen provided in at least one embodiment of the present disclosure, to simplify the fabrication process, as illustrated in FIG. 3a and FIG. 3b, a plurality of mutually independent self-capacitance electrodes 01 can be arranged in an array; wires 02 can extend in a column direction or a row direction.

For example, to ensure distribution uniformity of grooves (corresponding to first via holes) in an insulation layer, in an in-cell touch screen provided in at least one embodiment of the present disclosure, as for each self-capacitance electrode, the arrangement rule of first via holes in areas that a self-capacitance electrode overlaps other wires than the wire that is electrically connected with the self-capacitance electrode is the same as that of the first via hole in an area that the self-capacitance electrode overlaps the wire that is electrically connected with the self-capacitance electrode.

For example, in an in-cell touch screen provided in at least one embodiment of the present disclosure, to ensure distribution uniformity of grooves in an insulation layer, as illustrated in FIG. 3a and FIG. 3b, as to each wire 02, the distance of any two adjacent first via holes 04 having an overlapped area with the wire 02 is the same. Thus, it is ensured that all first via holes are uniformly distributed in an in-cell touch screen, hence ensuring uniformity of image display.

For example, to simplify a fabrication process, in an in-cell touch screen provided in at least one embodiment of the present disclosure, a plurality of mutually independent self-capacitance electrodes are disposed on a same layer. Thus, patterns of all self-capacitance electrodes can be formed in one pattering process, hence simplifying process steps and saving fabrication cost. Certainly, the self-capacitance electrodes can also be fabricated in layers, which will not be limited herein.

In an specific implementation, an in-cell touch screen provided in any above embodiment of the present disclosure can be applied in a liquid crystal display screen of TN (Twisted Nematic) type, ADS (Advanced Dimension Switch) type, HADS (High-Advanced Dimension Switch) type or IPS (In-Plane Switch) type.

For example, in the case of an above in-cell touch screen provided in the embodiment of the present disclosure being applied in a liquid crystal display screen of ADS type, a common electrode layer with a plate structure is located below a slit-type pixel electrode, that is, a common electrode is provided between a lower substrate and a pixel electrode, and a passivation layer is further provided between the pixel electrode and the common electrode. In the case of application in a liquid crystal display screen of HADS type, a slit-type common electrode is located above a pixel electrode with a plate structure, that is, a pixel electrode is provided between an lower substrate and a common electrode, and a passivation layer is further provided between the pixel electrode an the common electrode.

Figure 2D:
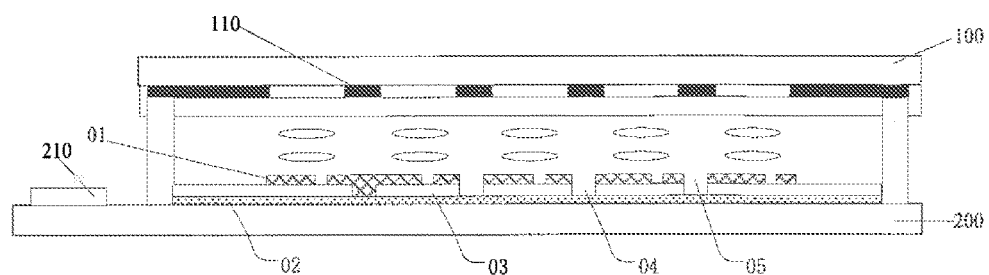
FIG. 2d is a schematic section view of an in-cell touch screen provided in an embodiment of the present disclosure.

In the case of an above in-cell touch screen, provided in the embodiment of the present disclosure, being applied in a liquid crystal display screen of ADS or HADS type, to simplify fabrication process and reduce a fabrication cost, a way that a common electrode layer on a lower substrate is reused as a self-capacitance electrode can be employed, for example, the self-capacitance electrodes can collectively constitute a common electrode layer located on side facing, an upper substrate, of a lower substrate. For example, as illustrated in FIG. 2d, an in-cell touch screen can further comprise a touch detection chip 210 that is configured to apply common electrode signals to respective self-capacitance electrodes in a display period and determine a touch position by detecting variation of capacitance value of each self-capacitance electrode in a touch period. Thus, if a structure of a common electrode layer is changed and divided into self-capacitance electrodes to realize a touch function, on a basis of common processes for fabrication of an array substrate in the related technical field, no extra process is required, saving manufacturing cost and improving production efficiency.

According to a specific mode/type of a liquid crystal display screen in which an above in-cell touch screen is applied, in the case of a common electrode layer being reused as respective self-capacitance electrodes, each self-capacitance electrode is of a slit-type electrode structure (for example, ITO (indium tin oxide) electrode structure) or a plate-type electrode structure at a position corresponding to an aperture area of a pixel, that is, in a HADS mode, each self-capacitance electrode includes a slit-type electrode, for example, the slit-type electrode structure is an ITO electrode that has a slit in a pixel aperture area. In an ADS mode, a plate-type electrode (for example, an ITO electrode) is included in respective self-capacitance electrodes to meet requirement of liquid display, in such a case, a portion, corresponding to a slit area of pixel electrodes, of a self-capacitance electrode interacts with a human electric field. Because a specific structure in a liquid crystal display screen of ADS mode and HADS mode can be referred to the common technology for those skilled in the art, redundant description will not be repeated here.

Generally, the resolution of a touch screen is usually at a millimeter level, therefore, in a specific implementation, the density and occupied area of respective self-capacitance electrodes can be selected according to touch resolution needed to ensure required touch resolution, and each self-capacitance electrode is usually designed as a square electrode with a dimension of about 5*5 mm. The resolution of a display screen is usually at a micrometer level, therefore, a self-capacitance electrode usually corresponds to a plurality of pixels in a display screen.

Specifically, because in an above in-cell touch screen provided in the embodiment of present disclosure a common electrode layer is reused as a self-capacitance electrode, in a specific implementation, in order to reduce mutual interference between display signal and touch signal, for example, a mode that touch and display are driven in a time-sharing manner may be employed. For example, in a specific implementation, a display drive chip and a touch detection chip can be integrated as one chip, so as to further reduce manufacturing cost.

Figure 4A:
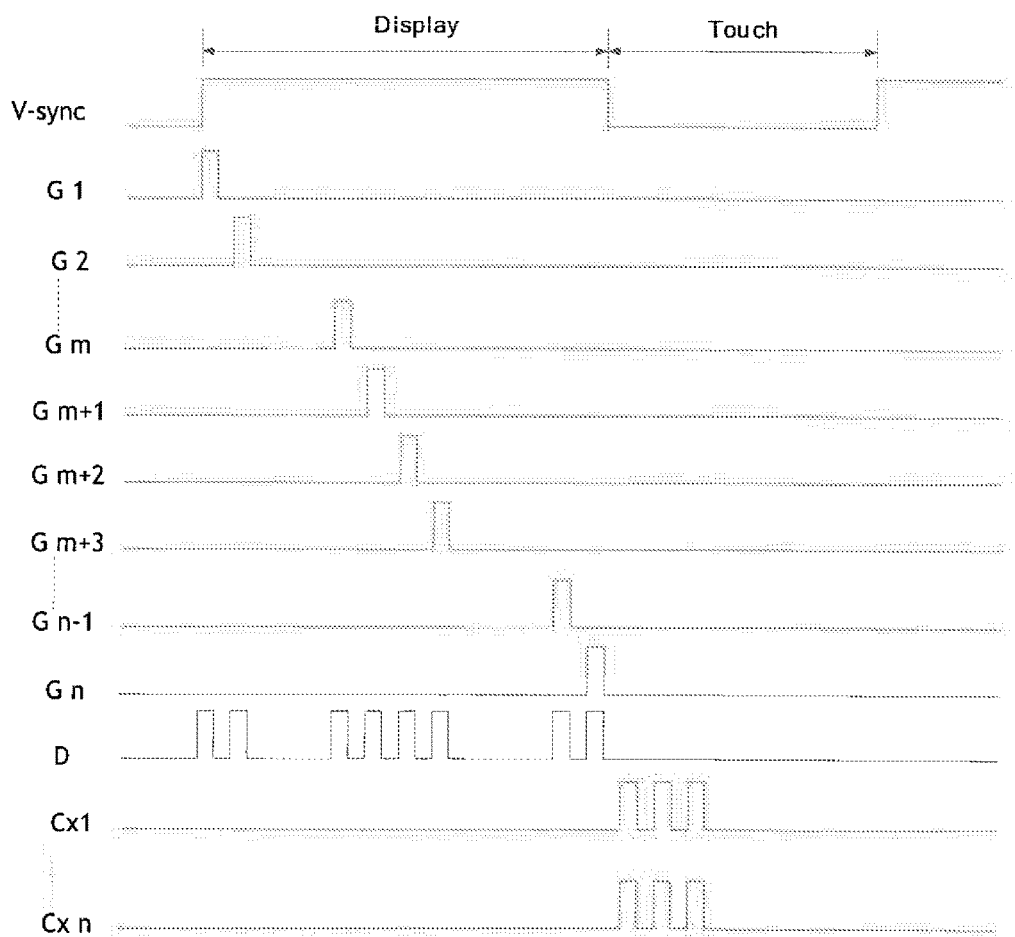
FIG. 4a is a schematic view for a first drive sequence of an in-cell touch screen provided in an embodiment of the present disclosure.
Figure 4B:
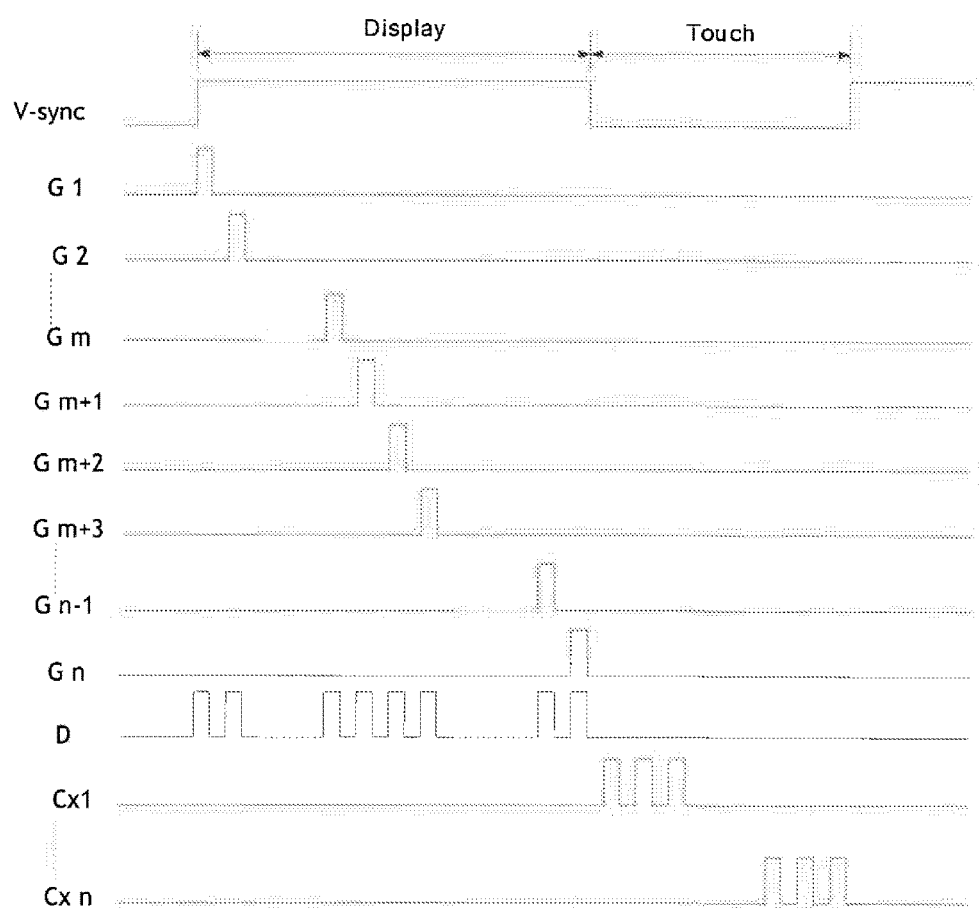
FIG. 4b is a schematic view for a second drive sequence of an in-cell touch screen provided in an embodiment of the present disclosure.

For example, in a driving timing diagram as illustrated in FIG. 4a and FIG. 4b, the time period of displaying each frame by a touch screen is divided into a display period and a touch period, for example, in a driving timing diagram as illustrated in FIG. 4a and FIG. 4b, the time period of displaying one frame by a touch screen is 16.7 ms, in which 5 ms is selected as a touch period and rest 11.7 ms is selected as a display period; of course, the time duration of the two periods may also be adjusted according to processing capability of an IC chip, which will not be specifically limited herein. In a display period of a touch screen, a gate scanning signal is applied on each gate electrode signal line (G1, G2 . . . Gn), gray level signals are applied on data signal lines D, and the touch detection chip that is connected with respective self-capacitance electrodes Cx1 . . . Cxn applies a common electrode signal on respective self-capacitance electrodes Cx1 . . . Cxn, thus realizing liquid crystal display function. In a touch period, as illustrated in FIG. 4a, an touch detection chip that is connected with respective self-capacitance electrodes Cx1 . . . Cxn applies a drive signal on each self-capacitance electrode Cx1 . . . Cxn simultaneously and meanwhile, receives feedback signal of the respective self-capacitance electrodes Cx1 . . . Cxn simultaneously; or as illustrated in FIG. 4b, an touch detection chip that is connected with respective self-capacitance electrodes Cx1 . . . Cxn applies a drive signal on the respective self-capacitance electrodes Cx1 . . . Cxn in sequence and receives feedback signal of the respective self-capacitance electrodes Cx1 . . . Cxn respectively, which is not limited herein. Whether a touch occurs or not can be determined by means of analysis of feedback signals to realize a touch function.

For example, to simplify a fabrication process and reduce manufacturing cost, an in-cell touch screen above provided in at least one embodiment of the present disclosure can further include: data lines located below self-capacitance electrodes. The wires and data lines are disposed on a same layer and made of a same material. Thus, in preparation, the respective wires can be prepared on a same layer as data lines, which can be realized by modifying patterns of the corresponding film layer without adding a new extra fabrication process, therefore, achieving a goal of simplifying process steps, saving manufacturing cost and improving manufacturing efficiency.

In an in-cell touch screen above provided in the embodiment of the present disclosure, although a self-capacitance electrode is provided inside with a second via hole, the second via hole will not influence defection of a liquid crystal molecular regardless of its influence on the surrounding electric field, this is because in a display period what is transmitted over a wire is a common electrode voltage, and the voltage at the position of a second via hole of a self-capacitance electrode can be complemented by the common voltage over a wire, alleviating influence produced by a second via hole and ensuring uniformity of image display.

For example, to prevent a second via hole on a self-capacitance electrode from influencing a liquid crystal layer, an in-cell touch screen provided in at least one embodiment of the present disclosure can further include: a black matrix layer 110 located either on a side, facing an upper substrate 100, of a lower substrate 200 or on a side, facing a lower substrate 200, of an upper substrate 100; an orthogonal projection of the pattern of respective wires 02 on a lower substrate 200 is located within an area where pattern of a black matrix layer 110 is located; or an orthogonal projection of the pattern of respective second via holes on the lower substrate 200 is located within the area where pattern of a black matrix layer 110 is located. Thus, a wire or a second via hole is designed between pixels on an upper row and pixels on a lower row, and at this position a black matrix layer is provided, and therefore the black matrix layer covers the second via hole, liquid crystal molecules that can not be defected normally can be covered below the black matrix layer, which can further alleviate influence produced by a second via hole so as to ensure uniformity of image display.

For example, in an in-cell touch screen above provided in the embodiment of the present disclosure, a width of a wire at a position that a first via hole corresponds to is usually wider than a width thereof at other positions, which configuration is the same as that in a common technology in the related art and is not limited herein.

Figure 5A:
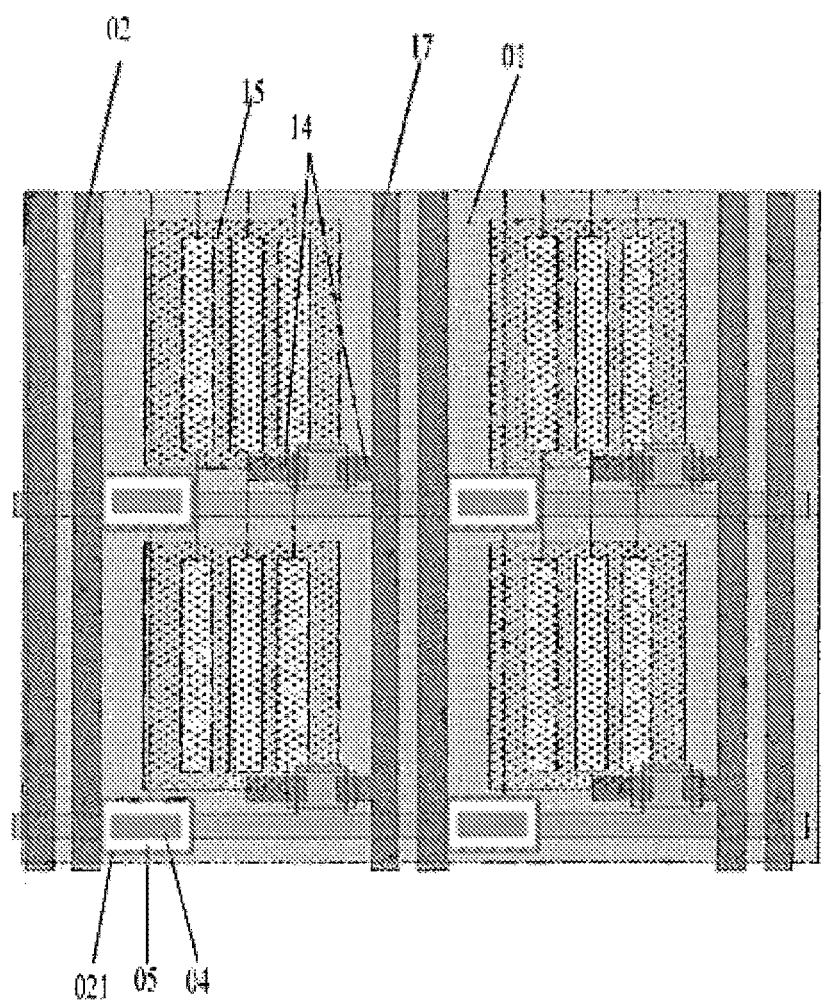
FIG. 5a is a partial schematic top view for a specific structure of an in-cell touch screen provided in an embodiment of the present disclosure.
Figure 5B:
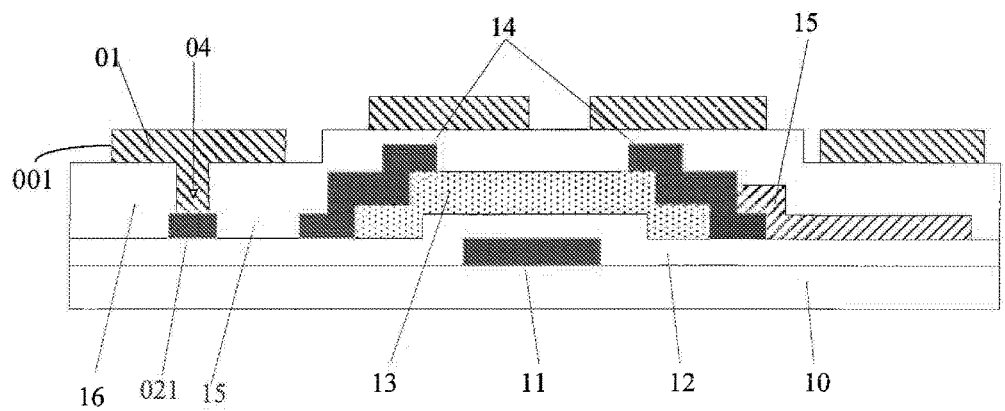
FIG. 5b is a schematic view of a sectional structure at a first via hole position of an in-cell touch screen provided in an embodiment of the present disclosure.
Figure 5C:
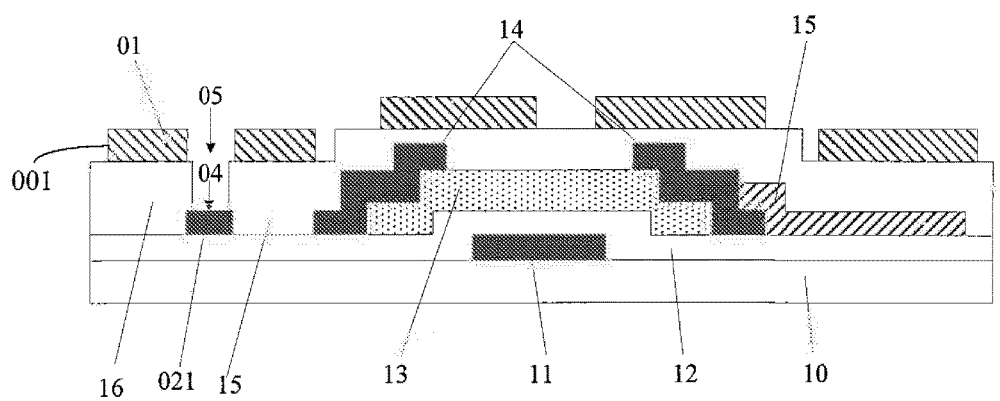
FIG. 5c is a schematic view of a sectional structure at a first/second via hole position of an in-cell touch screen provided in an embodiment of the present disclosure.

An in-cell touch screen provided in an embodiment of the present disclosure will be explained with a specific embodiment hereinafter, for example, as illustrated in FIG. 5a to FIG. 5c, an in-cell touch screen can include: a base substrate 10, and a gate electrode 11, a gate insulation layer 12, and an active layer 13 that are sequentially disposed on the base substrate 10, and a wire 02, a conductive base block 021, a source/drain electrode 14 and a data line 17 that are disposed on a same layer, and a pixel electrode layer 15, a passivation layer 16, and a common electrode layer 001 constitute a self-capacitance electrode 01. As illustrated in FIG. 5b, a first via hole 04 runs through a passivation layer 16, and a self-capacitance electrode 01 is electrically connected with a corresponding conductive base block 021 via a first via hole 04, so as to achieve an electrical connection of a self-capacitance electrode 01 and a corresponding wire 02. As illustrated in FIG. 5c, a self-capacitance electrode 01 at a position corresponding to a first via hole 04 is provided with a second via hole 05 that covers the first via hole 04, so as to guarantee that a self-capacitance electrode 01 at a position of a second via hole 05 is insulated from a conductive base block 021.

In a specific implementation, in an in-cell touch screen provided in the embodiment of the present disclosure, any patterning process that is commonly used in the field can be employed to fabricate each film layer on a lower substrate, such as six patterning processes including: a patterning process for forming gate electrodes and gate lines; a patterning process for forming an active layer; a patterning process for forming wires, data lines and source/drain electrodes; a patterning process for forming pixel electrodes; a patterning process for forming a passivation layer; and a patterning process for forming a common electrode layer. Of course, according to actual design, 5 patterning processes, 7 patterning processes or 8 patterning processes may also be employed, and the processes are not limited herein.

Based on a same conception of disclosure, at least one embodiment of the present disclosure further provides a display device that includes an in-cell touch screen according to any above embodiment of the present disclosure.

For example, the display device can be any product or component having a display function such as a sell phone, a tablet computer, a TV set, a display, a laptop computer, a digital frame or a navigator. The implementation of the display device can be referred to the embodiment of the above in-cell touch screen; those redundant descriptions will not be explained here anymore.

An in-cell touch screen and a display device are provided in the embodiments of the present disclosure. An insulation layer, within an area that each self-capacitance electrode overlaps wires, is provided with at least a first via hole that runs through the insulation layer and each self-capacitance electrode is electrically connected with a corresponding wire via a corresponding first via hole. Each self-capacitance electrode, within an area overlapping other wires than the wire that corresponds to itself and at a position that corresponds to a first via hole, is disposed with a second via hole that runs through a self-capacitance electrode, and a orthogonal projection of a second via hole on a lower substrate covers an orthogonal projection of a first via hole on the lower substrate. The in-cell touch screen, on the basis of ensuring that first via holes are uniformly distributed in an insulation layer, can guarantee a corresponding wire is electrically connected with a self-capacitance electrode, and therefore, a self-capacitance electrode is insulated from the other wires than a corresponding wire that is electrically with the self-capacitance electrode. Thus, based on ensuring the correct connection of a self-capacitance electrode with a wire, the problem of nonuniform image display, which is caused by nonuniform distribution of via holes in an insulation layer, can be solved.

What are described above is related to the illustrative embodiments of the disclosure only and not limitative to the scope of the disclosure. The scopes of the disclosure are defined by the accompanying claims.

This application claims the benefit of Chinese patent application No. 201510012621.6 filed in China on Jan. 9, 2015, which is incorporated by reference herein as a part of this application.

The invention claimed is:

1. An in-cell touch screen, comprising:
an upper substrate and a lower substrate that are provided opposite to each other;
a plurality of mutually independent self-capacitance electrodes disposed on a side, facing the lower substrate, of the upper substrate, or disposed on aside, facing the upper substrate, of the lower substrate;
wires that are disposed on a different layer from the self-capacitance electrodes and electrically connected correspondingly with the self-capacitance electrodes in a one-to-one manner; and
an insulation layer that is provided between the self-capacitance electrodes and the wires;
wherein the mutually independent self-capacitance electrodes comprise at least one first self-capacitance electrode that overlaps at least two of the wires, and the at least two of the wires comprise a first wire that is connected with the first self-capacitance electrode and at least one second wire that is not connected with the first self-capacitance electrode;
the insulation layer, in an area where the first self-capacitance electrode overlaps each of the at least two wires, is provided with at least one first via hole running through the insulation layer, and the first self-capacitance electrode is electrically connected with the first wire through the at least one first via hole overlapping the first wire;
the first self-capacitance electrode is provided with a second via hole which overlaps each of the at least one second wire, and the at least one second via hole runs through the first self-capacitance electrode, and an orthogonal projection of the second via hole on the lower substrate covers an orthogonal projection of the at least one first via holes overlapping each of the at least one second wire.

2. The in-cell touch screen according to claim 1, wherein shapes and sizes of first via holes of the first self-capacitance electrode are the same.

3. The in-cell touch screen according to claim 1, wherein the at least two of the wires comprise a third wire that is not overlapped with the first self-capacitance electrode, another second via hole is also disposed within an area of the first self-capacitance electrode overlapping an extending line of the third wire.

4. The in-cell touch screen according to claim 1, wherein a diameter of the first via hole is less than a width of the first wire overlapping the first via hole, and a diameter of the second via hole is less than a width of the second wire overlapping the second via hole.

5. The in-cell touch screen according to claim 1, further comprising: a conductive base block that is disposed on a same layer as the respective wires and corresponds to each first via hole, and an orthogonal projection of the conductive base block on the lower substrate covers the orthogonal projection of the second via hole on the lower substrate;
each of the wires is connected with a corresponding one of the mutually self-capacitance electrodes via a corresponding conductive base block.

6. The in-cell touch screen according to claim 1, wherein the wires extend in a same direction and lengths of the wires are the same.

7. The in-cell touch screen according to claim 1, wherein the plurality of mutually independent self-capacitance electrodes are arranged in an array and the wires extends in a column direction or a row direction.

8. The in-cell touch screen according to claim 1, wherein as for each of the first self-capacitance electrode, a distribution rule of the first via hole located within an area that the self-capacitance electrode overlaps the second wire is the same as that of the first via hole within an area that the first self-capacitance electrode overlaps the first wire.

9. The in-cell touch screen according to claim 1, wherein as for each of the wires, a distance between any two adjacent first via holes both having an overlapped area with each of the wires is the same.

10. The in-cell touch screen according to claim 1, wherein the plurality of mutually independent self-capacitance electrodes is disposed on a same layer.

11. The in-cell touch screen according to claim 10, wherein in the case where the self-capacitance electrodes are disposed in a common electrode layer on the side, facing the upper substrate, of the lower substrate, the in-cell touch screen further comprise: a touch detection chip;
the touch detection chip is configured to apply a common electrode signal on the respective self-capacitance electrodes in a display period and determine a touch position by detecting variation of capacitance value of the respective self-capacitance electrodes in a touching period.

12. The in-cell touch screen according to claim 1, further comprising: data lines located below the self-capacitance electrodes, wherein the respective wires and the data lines are disposed on a same layer and formed of same material.

13. The in-cell touch screen according to claim 1, further comprising: a black matrix layer on the side, facing the upper substrate, of the lower substrate or on the side, facing the lower substrate, of the upper substrate;
an orthogonal projection of a pattern of the respective wires is located within an area that a pattern of the black matrix layer is located; or an orthogonal projection of a pattern of the second via hole on the lower substrate is located within an area that the pattern of the black matrix is located.

14. A display device, comprising the in-cell touch screen according to claim 1.

15. The in-cell touch screen according to claim 5, wherein the plurality of mutually independent self-capacitance electrodes are arranged in an array and the wires extends in a column direction or a row direction.

16. The in-cell touch screen according to claim 5, wherein as for each of the first self-capacitance electrode, a distribution rule of the first via hole located within an area that the first self-capacitance electrode overlaps the second wire is the same as that of the first via hole within an area that the fit self-capacitance electrode overlaps the first wire.

17. The in-cell touch screen according to claim 5, wherein the plurality of mutually independent self-capacitance electrodes is disposed on a same layer.

18. The in-cell touch screen according to claim 17, wherein in the case where the self-capacitance electrodes are disposed in a common electrode layer on the side, facing the upper substrate, of the lower substrate, the in-cell touch screen further comprise: a touch detection chip;

the touch detection chip is configured to apply a common electrode signal on the respective self-capacitance electrodes in a display period and determine a touch position by detecting variation of capacitance value of the respective self-capacitance electrodes in a touching period.

19. The in-cell touch screen according to claim 18, further comprising: a black matrix layer on the side, facing the upper substrate, of the lower substrate or on the side, facing the lower substrate, of the upper substrate;

an orthogonal projection of a pattern of the respective wires is located within an area that a pattern of the black matrix layer is located; or an orthogonal projection of a pattern of the second via hole on the lower substrate is located within an area that the pattern of the black matrix is located.

20. The in-cell touch screen according to claim 1, wherein the first self-capacitance electrode is not connected with the at least a second wire through the second via hole.

\* \* \* \* \*